US012586937B2

(12) United States Patent
Yoshida et al.

(10) Patent No.: US 12,586,937 B2
(45) Date of Patent: Mar. 24, 2026

(54) CONNECTOR AND ELECTRONIC DEVICE

(71) Applicant: KYOCERA CORPORATION, Kyoto (JP)

(72) Inventors: Munenobu Yoshida, Yamato (JP); Yo Kitamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 316 days.

(21) Appl. No.: 18/276,870

(22) PCT Filed: Feb. 3, 2022

(86) PCT No.: PCT/JP2022/004324
§ 371 (c)(1),
(2) Date: Aug. 10, 2023

(87) PCT Pub. No.: WO2022/172861
PCT Pub. Date: Aug. 18, 2022

(65) Prior Publication Data

US 2024/0120671 A1 Apr. 11, 2024

(30) Foreign Application Priority Data

Feb. 12, 2021 (JP) ................................ 2021-021206

(51) Int. Cl.
*H01R 12/71* (2011.01)

(52) U.S. Cl.
CPC ................................ *H01R 12/716* (2013.01)

(58) Field of Classification Search
CPC ...... H01R 12/716; H01R 12/57; H01R 4/028; H01R 13/46; H01R 12/73; H01R 12/71; H01R 12/51; H01R 13/24
USPC ........................................................ 439/74
See application file for complete search history.

(56) References Cited

U.S. PATENT DOCUMENTS

| | | | | |
|---|---|---|---|---|
| 3,278,884 A * | 10/1966 | Bottlik | H01R 12/82 | 439/74 |
| 5,904,581 A * | 5/1999 | Pope | H01R 24/60 | 439/74 |
| 5,928,003 A | 7/1999 | Kajinuma | | |
| 11,217,924 B2 | 1/2022 | Kobayashi | | |

(Continued)

FOREIGN PATENT DOCUMENTS

| | | |
|---|---|---|
| CN | 111247696 A | 6/2020 |
| JP | H06325825 A | 11/1994 |

(Continued)

*Primary Examiner* — Charles Reid, Jr.
(74) *Attorney, Agent, or Firm* — Duane Morris LLP

(57) ABSTRACT

A connector (10) is mounted on a circuit board (CB1) and is to be mated with a connection object (50). The connector (10) includes an insulator (20) and multiple contacts (40). The insulator (20) includes two side walls (21*b*) and has a rectangular shape. The contacts (40) are attached to the side walls (21*b*). The contacts (40) each include a mounting portion (41), a resilient portion (43), and a contacting portion (46). The mounting portion (41) is mounted on the circuit board (CB1). The contacting portion (46) is configured to contact a connection object (50) while the connector (10) and the connection object (50) are mated with each other. The resilient portion (43) is located between the mounting portion (41) and the contacting portion (46) and is resiliently deformable. The resilient portion (43) and the insulator (20) define a space therebetween.

5 Claims, 12 Drawing Sheets

(56) References Cited

U.S. PATENT DOCUMENTS

| | | | | |
|---|---|---|---|---|
| 11,239,591 | B2 | 2/2022 | Morita et al. | |
| 11,605,913 | B2 | 3/2023 | Miyamoto et al. | |
| 2005/0070137 | A1* | 3/2005 | Goto | H01R 12/716 439/74 |
| 2005/0101163 | A1* | 5/2005 | Obikane | H01R 13/6471 439/74 |

FOREIGN PATENT DOCUMENTS

| | | | |
|---|---|---|---|
| JP | H1021981 | A | 1/1998 |
| JP | 2015056202 | A | 3/2015 |
| JP | 2017204479 | A | 11/2017 |
| JP | 2020068093 | A | 4/2020 |
| JP | 2021064443 | A | 4/2021 |
| KR | 20200043481 | A | 4/2020 |

* cited by examiner

CONNECTOR AND ELECTRONIC DEVICE

CROSS-REFERENCE TO RELATED APPLICATIONS

The present application claims priority to Japanese Patent Application No. 2021-021206, filed on Feb. 12, 2021, which is hereby incorporated by reference herein in its entirety.

TECHNICAL FIELD

The present disclosure relates to a connector and an electronic device.

BACKGROUND OF INVENTION

A contact or a fitting attached to a connector includes a mounting portion to be mounted on a circuit board. A known technique is to reduce separation, breakage, and the like of such a mounting portion caused by, for example, a solder crack resulting from stress applied to the mounting portion.

Patent Literature 1 discloses a receptacle connector equipped with a circuit board. The receptacle connector exhibits increased strength of fixed connection to a circuit board, prevents a connecting portion of a terminal from separating from the circuit board, and can prevent damage to the connecting portion. Patent Literature 2 discloses a board connector that can mitigate stress applied from a housing to a board fixation portion and in which the board fixation portion is fixed to a board with increased strength.

CITATION LIST

Patent Literature

Patent Literature 1: Japanese Unexamined Patent Application Publication No. 2017-204479

Patent Literature 2: Japanese Unexamined Patent Application Publication No. 2015-056202

SUMMARY

In an embodiment of the present disclosure, a connector is mounted on a circuit board and is to be mated with a connection object. The connector includes an insulator and multiple contacts. The insulator includes a pair of side walls and has a rectangular shape. The multiple contacts are attached to the pair of side walls. Each of the multiple contacts includes a mounting portion, a resilient portion, and a contacting portion. The mounting portion is mounted on the circuit board. The contacting portion is configured to contact a connection object while the connector and the connection object are mated with each other. The resilient portion is located between the mounting portion and the contacting portion and is resiliently deformable. The resilient portion and the insulator define a space therebetween.

In another embodiment of the present disclosure, an electronic device includes the above-described connector.

DESCRIPTION OF EMBODIMENTS

For each of the receptacle connector equipped with the circuit board disclosed in Patent Literature 1 and the board connector disclosed in Patent Literature 2, no adequate consideration is given to the movability of the connector based on resilient deformation of a contact and a reduction in load, caused by stress, on a mounting portion of the contact. For example, when the connector experiences forces including a force in a direction parallel to the circuit board and a rotational force in a plane parallel to the circuit board, stress is applied to the mounting portion of the contact, so that separation, breakage, and the like of the mounting portion may be caused by a solder crack, for example.

Market demands for connectors, in particular connectors mounted on, for example, industrial equipment and on-vehicle equipment, include improved workability of mating and a measure against vibration. Specifically, if a connection object is mated with a connector while the connection object is not aligned with the connector, and if vibration is applied to the connector and a circuit board, a mounting portion as a soldered portion may crack, causing separation and short-circuiting of the mounting portion.

For a measure to reduce a solder crack in the board connector disclosed in Patent Literature 2, the connector is fixed to the circuit board, and a fitting is used to disperse stress, thus reducing a load on the contact. However, the connector is not movable relative to the circuit board. If stress concentrated on the fitting causes displacement of the connector, stress may be exerted on the contact and the soldered portion, causing breakage and short-circuiting, for example.

In embodiments of the present disclosure, a connector and an electronic device have improved reliability because resilient deformation of a contact is used to make the connector movable relative to a circuit board and is further used to reduce a load on a mounting portion of the contact.

Figure 10:
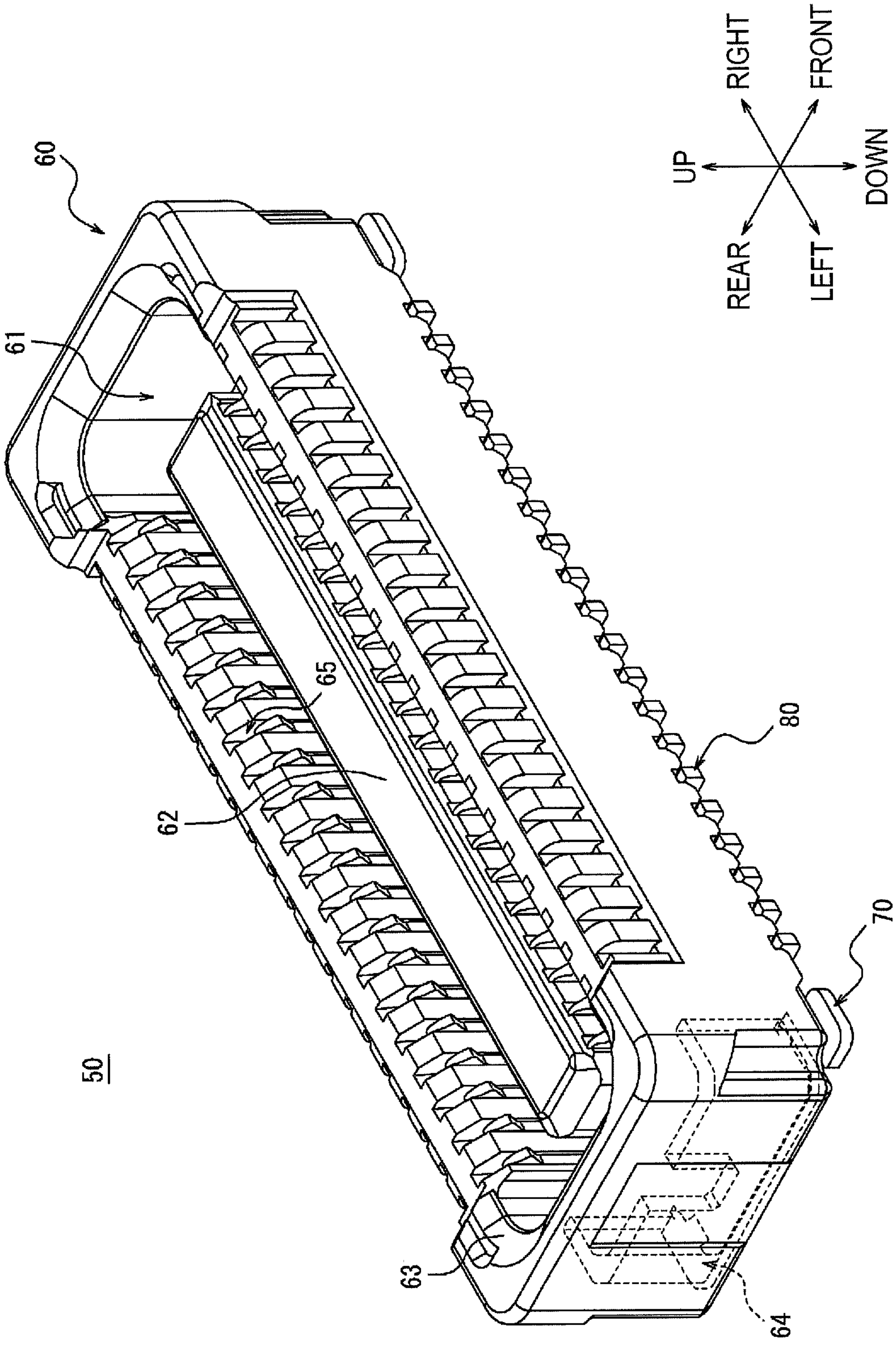
FIG. 10 is a downward perspective view of the connection object to be connected to the connector of FIG. 3.
Figure 11:
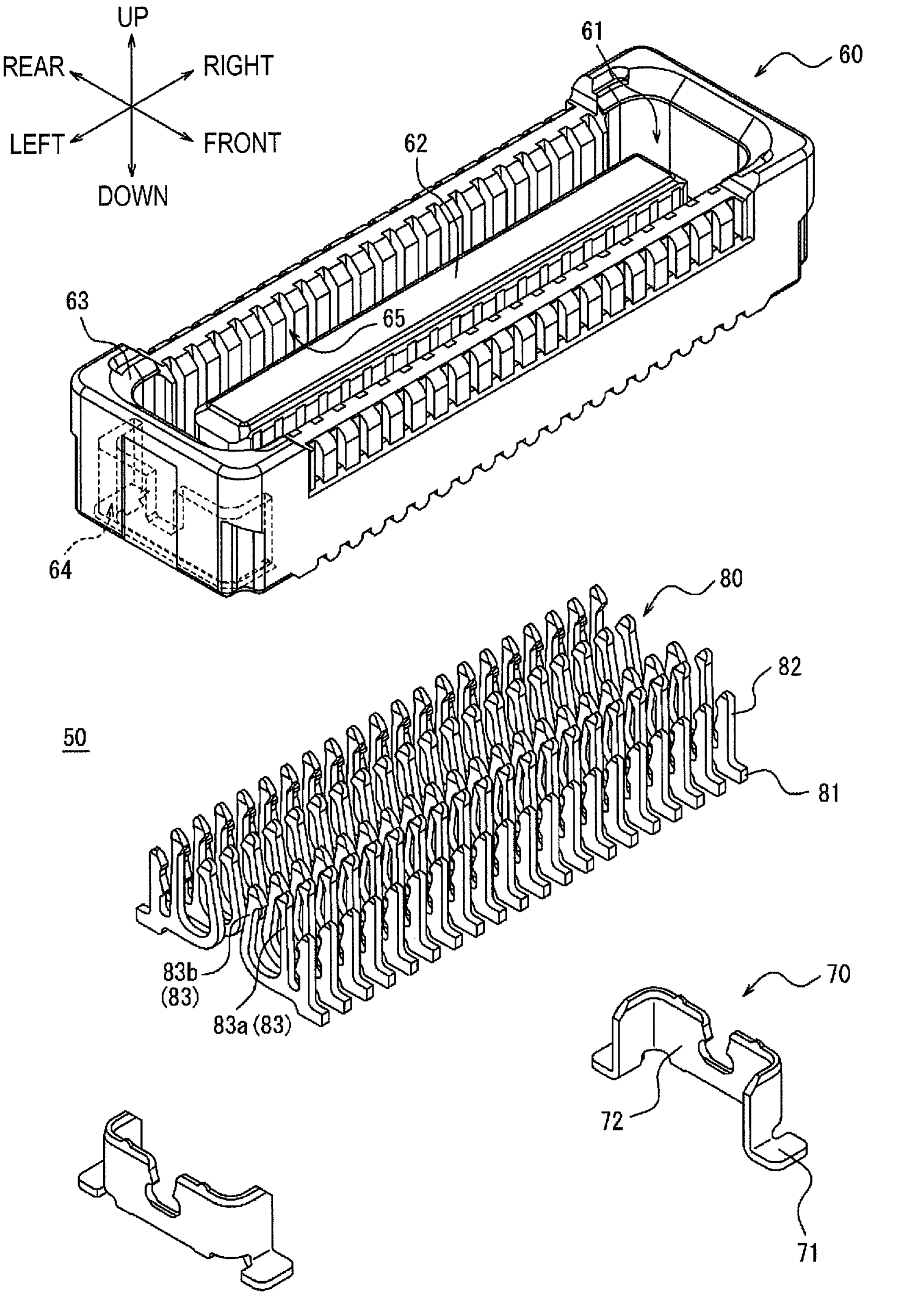
FIG. 11 is a downward exploded perspective view of the connection object of FIG. 10.

An embodiment of the present disclosure will be described in detail below with reference to the accompanying drawings. In the following description, front-rear, left-right, and up-down directions are based on directions of arrows in the figures. The directions of the arrows in different figures, FIGS. 1 to 9 and 12, are consistent with each other. The directions of the arrows in FIGS. 10 and 11 are consistent with each other. For simplification of illustration, circuit boards CB1 and CB2, which will be described later, are not illustrated in some of the figures.

Figure 1:
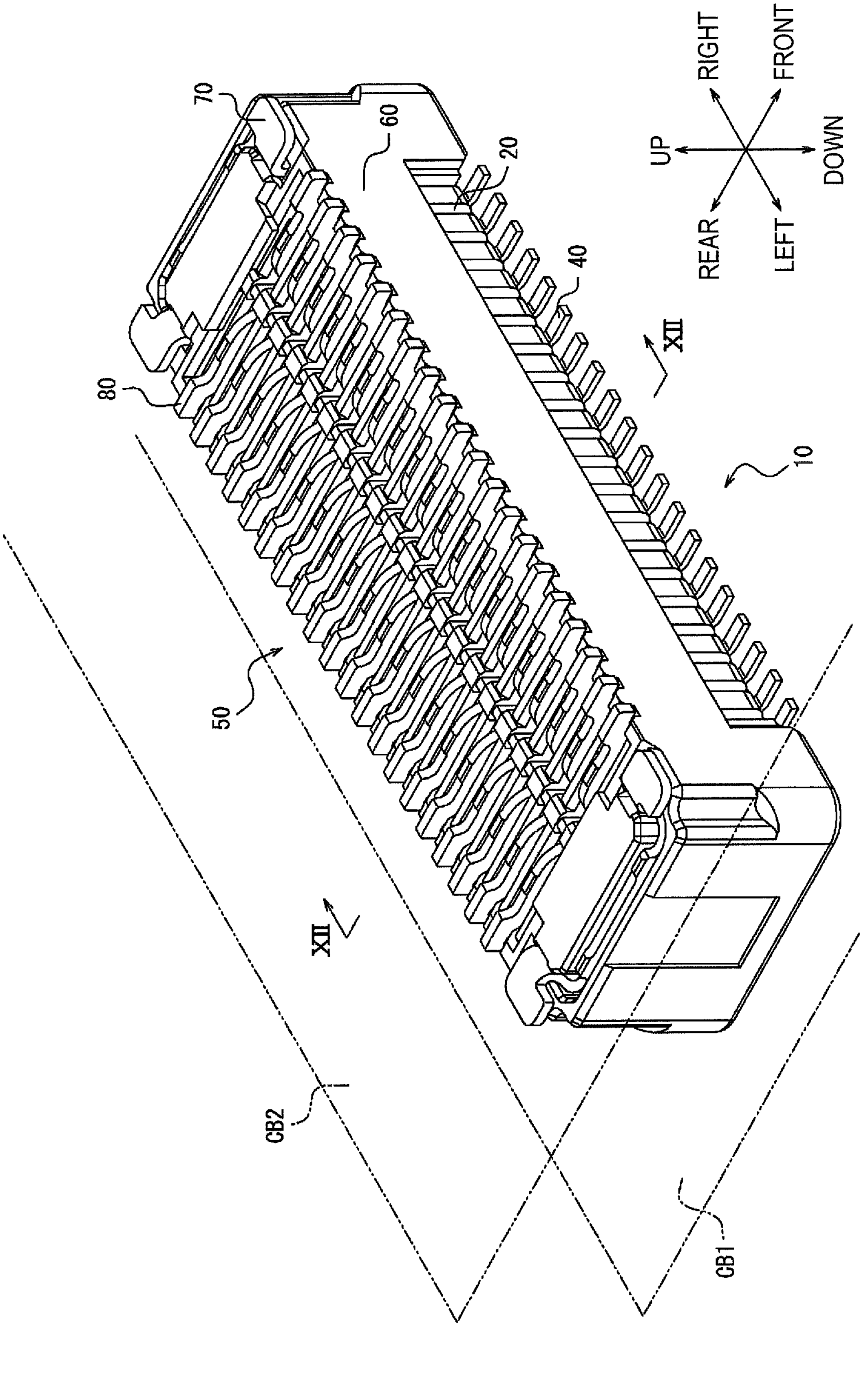
FIG. 1 is a downward perspective view of a connector according to an embodiment connected to a connection object.
Figure 2:
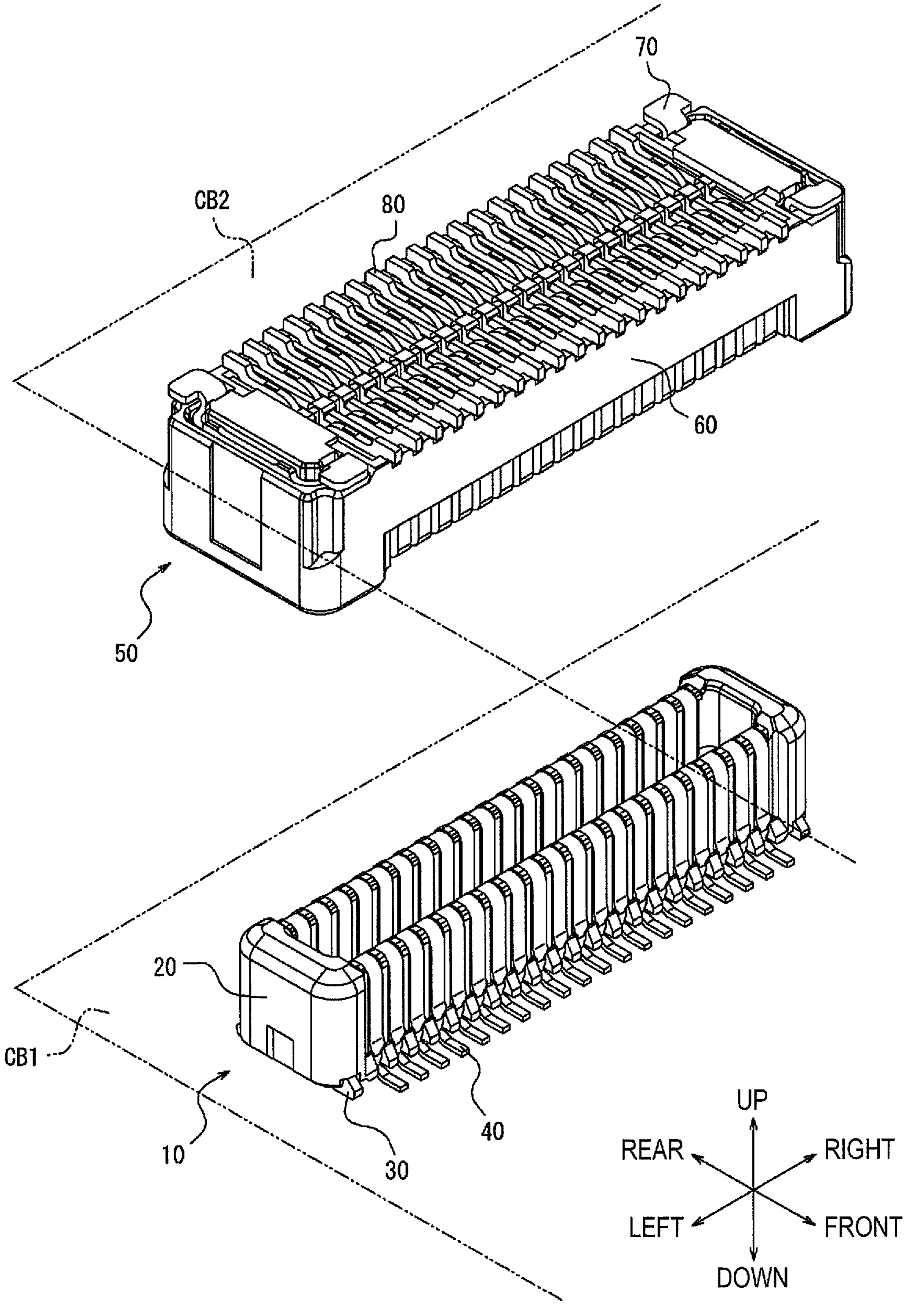
FIG. 2 is a downward perspective view of the connector according to the embodiment separated from the connection object.

FIG. 1 is a downward perspective view of a connector 10 according to an embodiment connected to a connection object 50. FIG. 2 is a downward perspective view of the connector 10 according to the embodiment separated from the connection object 50. As illustrated in FIG. 2, for example, the connector 10 includes an insulator 20, fittings 30, and contacts 40. The connection object 50 includes an insulator 60, fittings 70, and contacts 80.

In the following description, for example, the connector 10 according to the embodiment is a plug connector, and the connection object 50 is a receptacle connector. In the connector 10 as a plug connector, a portion of each contact 40 that is in contact with the corresponding contact 80 is not resiliently deformed in a mated state in which the connector 10 and the connection object 50 are mated with each other. On the other hand, in the connection object 50 as a receptacle connector, a portion of each contact 80 that is in contact with the corresponding contact 40 is resiliently deformed in the mated state. The types of the connector 10 and the connection object 50 are not limited to those in this example. For example, the connector 10 may serve as a receptacle connector, and the connection object 50 may serve as a plug connector.

In the following description, the connector 10 is mounted on the circuit board CB1, and the connection object 50 is mounted on the circuit board CB2. The connector 10 electrically connects the circuit board CB1 to the circuit board CB2, on which the connection object 50 is mounted, through the connection object 50 mated with the connector 10. Each of the circuit boards CB1 and CB2 may be a rigid board or may be any other circuit board. For example, at least one of the circuit board CB1 or the circuit board CB2 may be a flexible printed circuit board (FPC).

In the following description, the connector 10 and the connection object 50 are connected to each other in a direction perpendicular to the circuit boards CB1 and CB2. For example, the connector 10 and the connection object 50 are connected to each other in the up-down direction. The manner of connection is not limited to this example. The connector 10 and the connection object 50 may be connected to each other in a direction parallel to the circuit boards CB1 and CB2. The connector 10 and the connection object 50 may be connected to each other such that one of the connector 10 and the connection object 50 is perpendicular to the circuit boards on which the connector 10 and the connection object 50 are mounted and such that the other one of them is parallel to the circuit boards on which the connector 10 and the connection object 50 are mounted.

As used herein, the term "mating direction" refers to, for example, the up-down direction. The term "lateral direction of the connector 10" refers to, for example, the front-rear direction. The term "thickness direction of the contact 40" refers to, for example, the front-rear direction. The term "longitudinal direction of the connector 10" refers to, for example, the left-right direction. The term "direction perpendicular to the mating direction" refers to, for example, the front-rear direction or the left-right direction.

Figure 3:
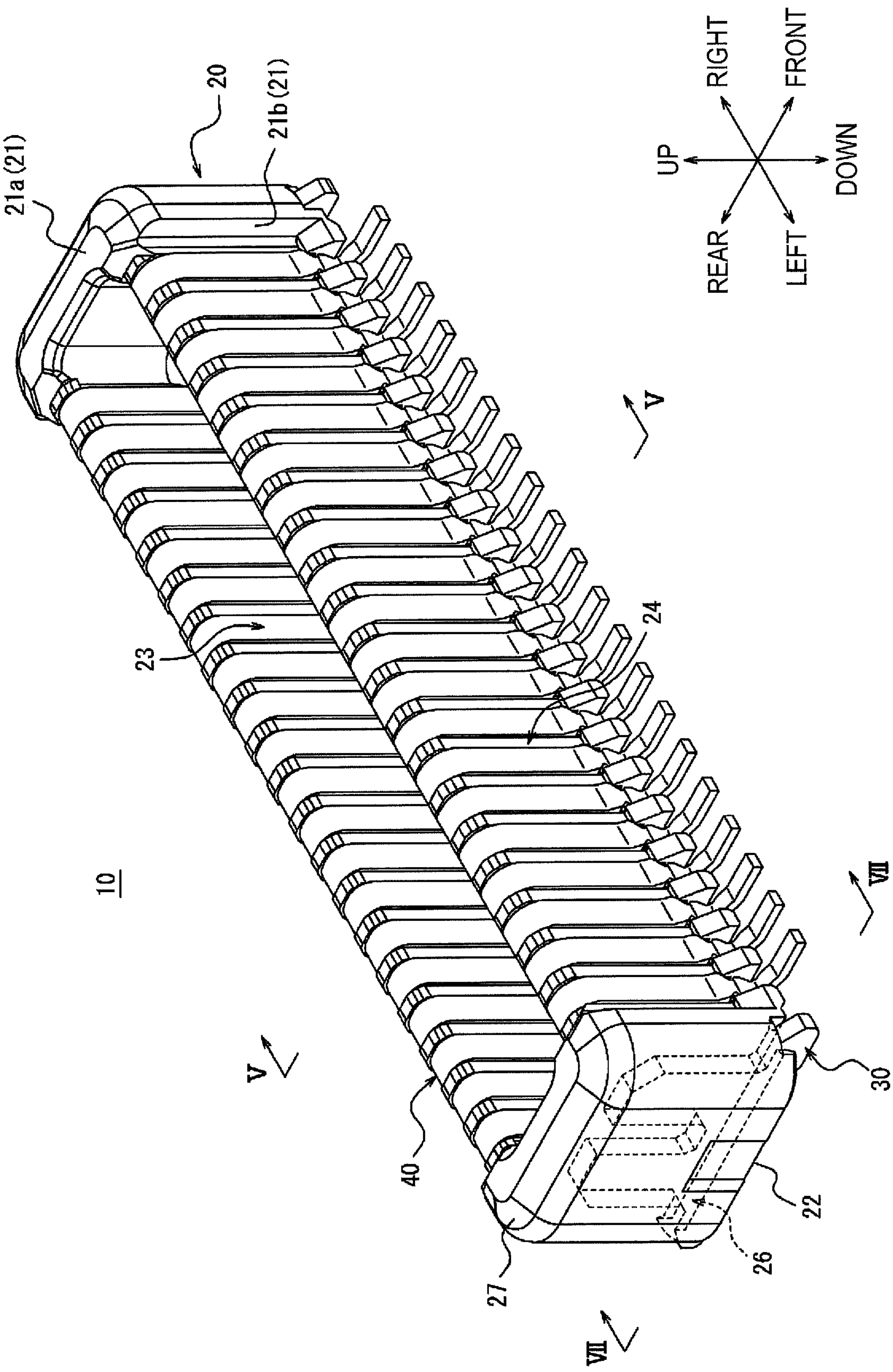
FIG. 3 is a downward perspective view of only the connector in FIG. 1.
Figure 4:
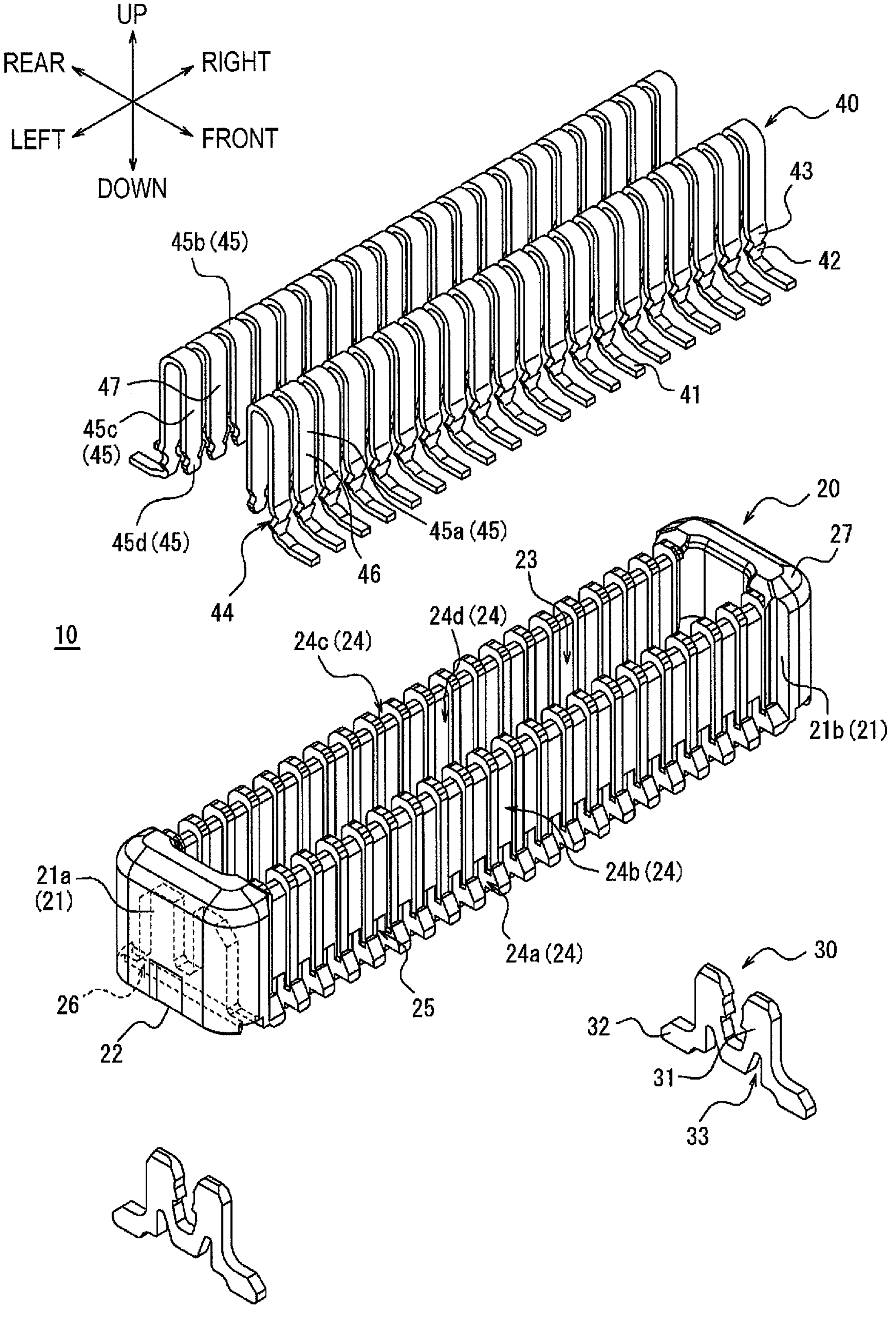
FIG. 4 is a downward exploded perspective view of the connector of FIG. 3.
Figure 5:
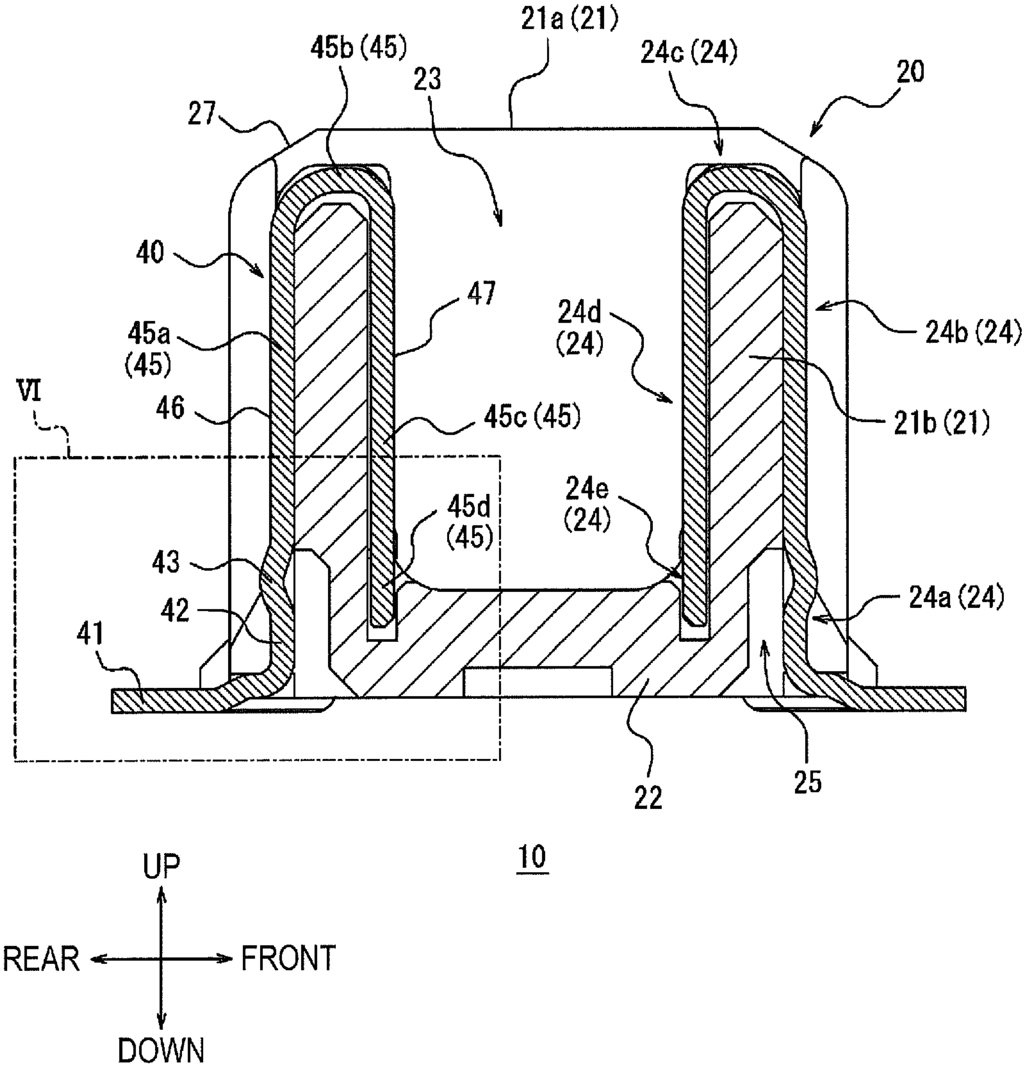
FIG. 5 is a cross-sectional view taken along arrow line V-V in FIG. 3.
Figure 6:
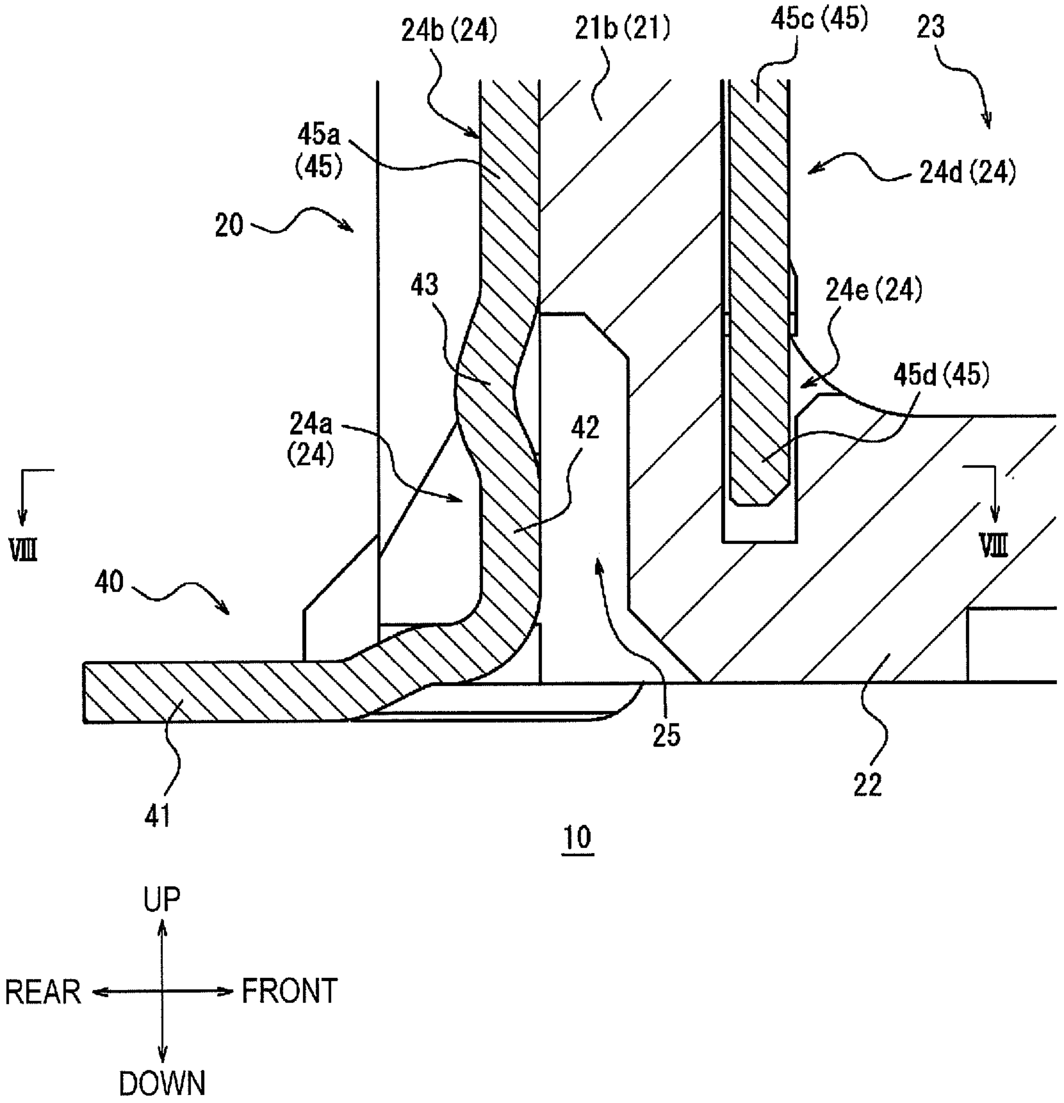
FIG. 6 is an enlarged view of part VI surrounded by an alternate long and short dash line in FIG. 5.
Figure 7:
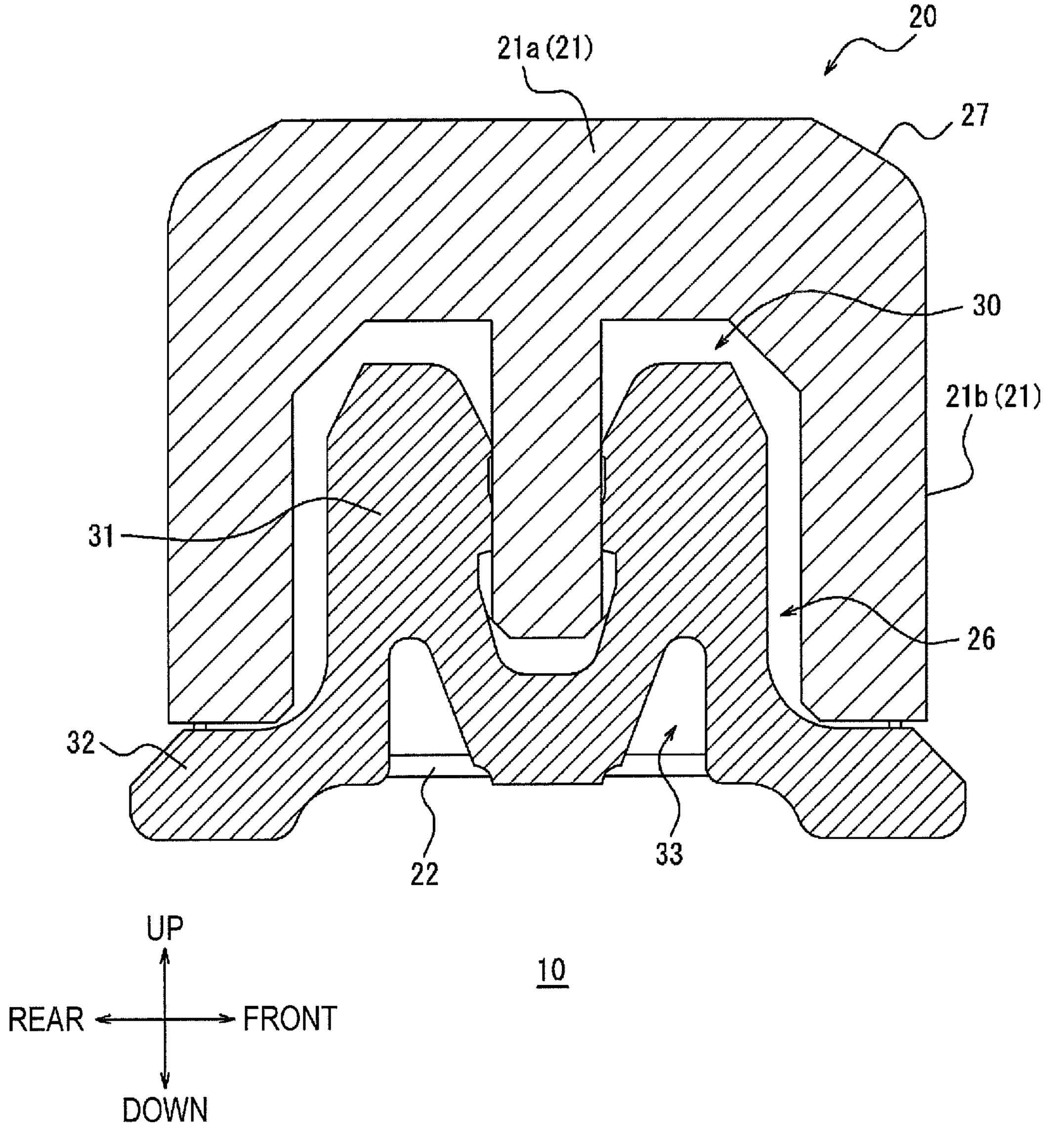
FIG. 7 is a cross-sectional view taken along arrow line VII-VII in FIG. 3.
Figure 8:
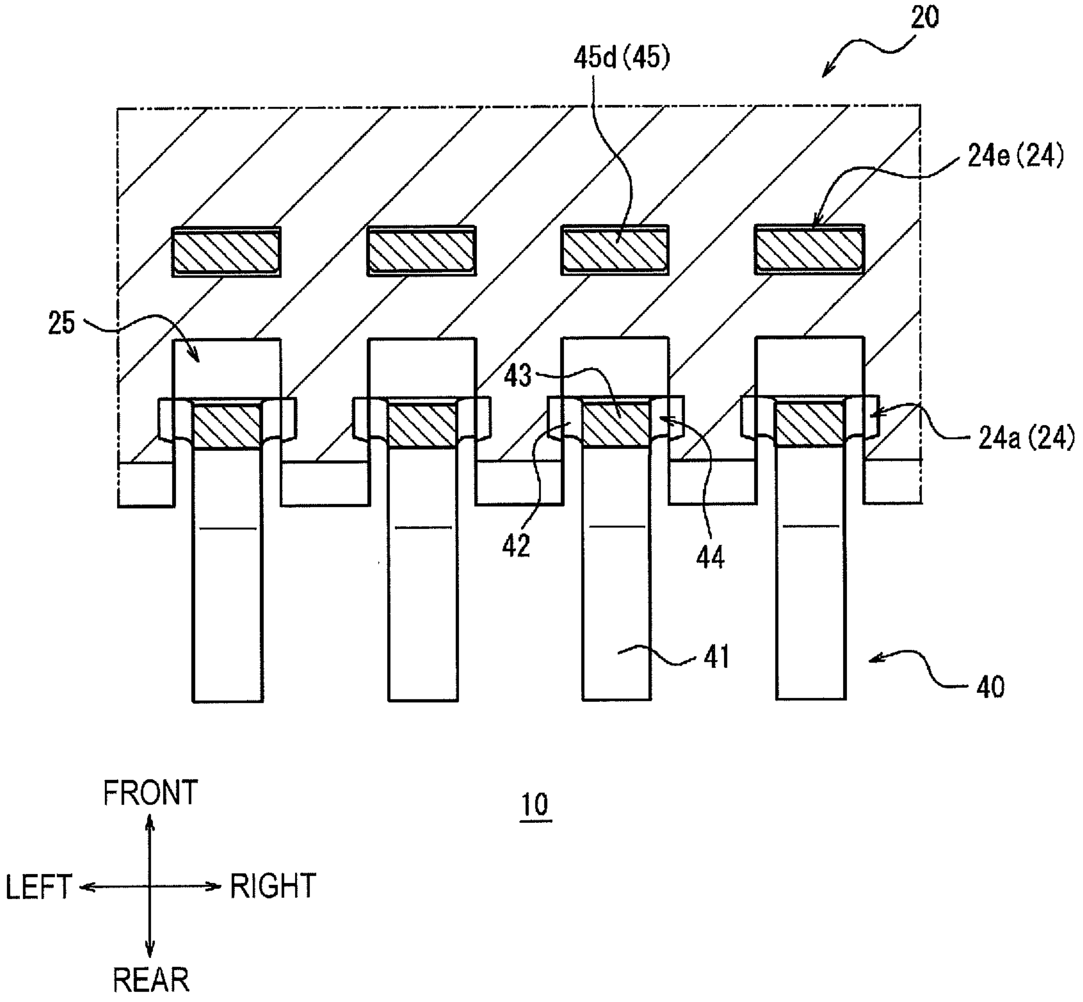
FIG. 8 is a sectional view taken along arrow line VIII-VIII in FIG. 6.

FIG. 3 is a downward perspective view of only the connector 10 in FIG. 1. FIG. 4 is a downward exploded perspective view of the connector 10 of FIG. 3. FIG. 5 is a cross-sectional view taken along arrow line V-V in FIG. 3. FIG. 6 is an enlarged view of part VI surrounded by an alternate long and short dash line in FIG. 5. FIG. 7 is a cross-sectional view taken along arrow line VII-VII in FIG. 3. FIG. 8 is a sectional view taken along arrow line VIII-VIII in FIG. 6.

As illustrated in FIG. 4, the connector 10 is assembled in the following manner, for example. The fittings 30 are press-fitted from below into the insulator 20. Similarly, the contacts 40 are press-fitted from above onto the insulator 20.

The configurations of components of the connector 10 in a state in which the contacts 40 are not resiliently deformed will be mainly described below. The configuration of the insulator 20 will now be mainly described with reference mainly to FIG. 4.

As illustrated in FIG. 4, the insulator 20 is a member made of an insulating heat-resistant synthetic resin material formed by injection molding, and extends in the left-right direction. The insulator 20 has a rectangular shape. The insulator 20 extends in the longitudinal direction of the connector 10, and is to be mated with the insulator 60 of the connection object 50. The insulator 20 includes an outer peripheral wall 21. The outer peripheral wall 21 includes front, rear, left, and right side walls, or four side walls, and surrounds an internal space of the insulator 20. More specifically, the outer peripheral wall 21 includes a pair of lateral walls 21*a* at opposite sides in the left-right direction and a pair of longitudinal walls 21*b* at opposite sides in the front-rear direction.

The insulator 20 includes a bottom wall 22 including an edge part from which the outer peripheral wall 21 protrudes upward. The bottom wall 22 continuously extends to connect the pair of longitudinal walls 21*b*. The insulator 20 includes a mating depression 23, which includes the internal space surrounded by the outer peripheral wall 21 and the bottom wall 22.

The insulator 20 includes multiple contact attachment grooves 24, which are arranged in the longitudinal walls 21*b* and each have an inverted U-shape. The multiple contact attachment grooves 24 are spaced apart from each other at predetermined intervals in the left-right direction.

As illustrated in FIG. 5, each of the contact attachment grooves 24 includes a first engaging portion 24*a*, which is located in a lower end of the longitudinal wall 21*b* on an outer side of the longitudinal wall 21*b* in the front-rear direction. The contact attachment groove 24 includes a first groove portion 24*b*, which extends upward from the first engaging portion 24*a* in the up-down direction on the outer side of the longitudinal wall 21*b* in the front-rear direction. The contact attachment groove 24 includes a turned portion 24*c*, which is located in an upper end of the longitudinal wall 21*b* and has an inverted U-shape such that the groove is turned at this portion. The contact attachment groove 24 includes a second groove portion 24*d*, which extends along the mating depression 23 on an inner side of the longitudinal wall 21*b* in the front-rear direction. The contact attachment groove 24 includes a second engaging portion 24*e*, which is located in the lower end of the longitudinal wall 21*b* on the inner side of the longitudinal wall 21*b* in the front-rear direction.

The insulator 20 includes recesses 25, which are located in the lower end of the longitudinal wall 21*b* on the outer side of the longitudinal wall 21*b* in the front-rear direction. Each recess 25 is aligned with the first engaging portion 24*a* and a lower end of the first groove portion 24*b* of the contact attachment groove 24 in the front-rear direction. The recess 25 is located inside the contact attachment groove 24 in the insulator 20. A dimension in the left-right direction of the recess 25 is substantially the same as that of the first engaging portion 24*a* of the contact attachment groove 24.

The recess 25 is formed in the insulator 20 and continuously extends from a position corresponding to the lower end of the first groove portion 24*b* of the contact attachment groove 24 in the up-down direction beyond a position corresponding to the first engaging portion 24*a* in the up-down direction to a bottom surface of the insulator 20.

As illustrated in FIG. 7, the insulator 20 includes fitting attachment grooves 26, which are located at opposite ends of the insulator 20 in the left-right direction and are recessed in the insulator 20. The insulator 20 includes a guide 27, which extends from the whole of an outer upper end portion of the lateral wall 21*a* to outer upper end portions of the longitudinal walls 21*b* at each of the opposite ends of the insulator 20 in the left-right direction. The guide 27 includes a sloped face that slopes obliquely outward in an up-to-down direction.

The configuration of each fitting 30 will now be described with reference mainly to FIGS. 4 and 7.

The fitting 30 is formed by shaping a sheet of any metallic material into a form illustrated in FIGS. 4 and 7 with a progressive die (stamping). The fitting 30 is formed only by stamping, for example. The fitting 30 is flat or uniform in thickness in the longitudinal direction of the connector 10. The method of forming the fitting 30 is not limited to this example. For example, the method may include, after stamping, bending a workpiece in the thickness direction. The fitting 30 is M-shaped when viewed in the left-right direction.

The fitting 30 includes engaging portions 31 constituting a central part of the fitting 30. The fitting 30 includes mounting portions 32 extending outward from the engaging portions 31 in the lateral direction of the connector 10. The fitting 30 includes notches 33 formed by cutting away parts of the engaging portions 31 that are located next to the mounting portions 32 extending from the engaging portions 31 and that extend in the mating direction in which the connector 10 and the connection object 50 are mated with each other. The fitting 30 is shaped such that the shapes and arrangement of the components are symmetrical in the front-rear direction. For example, the fitting 30 is shaped such that the shapes and arrangement of the components are symmetrical with respect to the centerline or axis of the fitting 30 extending in the up-down direction.

The configuration of each contact 40 will now be described with reference mainly to FIGS. 4 to 6 and 8.

The contact 40 is formed by shaping a sheet of, for example, a copper alloy containing, for example, phosphor bronze, beryllium copper, or titanium copper, and having spring resiliency or a Corson alloy into a form illustrated in FIGS. 4 to 6 and 8 with a progressive die (stamping). The contact 40 is formed by stamping the sheet into a workpiece and then bending the workpiece in the thickness direction. The thickness direction of the contact 40 is perpendicular to, for example, the longitudinal direction of the connector 10. The thickness direction of the contact 40 is substantially parallel to, for example, the lateral direction of the connector 10.

The contact 40 is made of, for example, a metallic material having a low modulus of elasticity, to produce a significant change in shape associated with resilient deformation. The contact 40 is plated with nickel, serving as an undercoat layer, and is further plated with, for example, gold or tin, serving as a surface layer.

As illustrated in FIG. 4, the multiple contacts 40 are arrayed in the left-right direction. As illustrated in FIG. 5, the contacts 40 are attached to the insulator 20. A pair of contacts 40 arrayed at the same position in the left-right direction are symmetrically shaped and arranged in the front-rear direction. The pair of contacts 40 are shaped and arranged symmetrically with respect to a centerline or axis extending therebetween in the up-down direction.

As illustrated in FIG. 4, each contact 40 includes a mounting portion 41, which is located at a lower end of the contact 40 and extends outward in the front-rear direction. The contact 40 includes a first engaging portion 42, which extends upward from an end of the mounting portion 41 and has a larger width than the mounting portion 41.

The contact 40 includes a bent portion 43, which extends upward from an upper end of the first engaging portion 42. The bent portion 43 serves as a resiliently deformable resilient portion. The resilient portion includes the bent portion 43, which is bent in a direction perpendicular to the mating direction in which the connector 10 and the connection object 50 are mated with each other. For example, the bent portion 43 is bent in the thickness direction of the contact 40. The bent portion 43 is bent to protrude outward beyond the first engaging portion 42 in the front-rear direction. As illustrated in FIG. 5, the bent portion 43 is bent to have a mound-like shape in cross-section and protrudes in a direction away from the insulator 20. The bent portion 43 is smoothly bent or raised to have a mound-like shape in cross-section and protrudes away from the insulator 20 outwardly in the front-rear direction.

As illustrated in FIGS. 4 and 8, the contact 40 includes a narrowed portion 44, which is located at an end of the bent portion 43 adjacent to the mounting portion 41 and reduces a dimension of the bent portion 43 in the longitudinal direction of the connector 10. The narrowed portion 44 is located at a lower end of the bent portion 43 and is next to the first engaging portion 42 in the up-down direction.

As illustrated in FIGS. 4 and 5, the contact 40 includes a supported section 45, which extends upward from an upper end of the bent portion 43 and has an inverted U-shape. The supported section 45 includes a first extending portion 45*a*, which extends straight upward from the upper end of the bent portion 43. The supported section 45 includes a turned portion 45*b*, which extends from an upper end of the first extending portion 45*a* and is turned in an inverted U-shape. The supported section 45 includes a second extending portion 45*c*, which extends straight downward from an inner end of the turned portion 45*b* in the front-rear direction. The supported section 45 includes a second engaging portion 45*d*, which is located at an end of the second extending portion 45*c*. The second engaging portion 45*d* includes a narrowed part reducing a dimension of the second engaging portion 45*d* in the left-right direction and a wide part extending downward from the narrowed part.

The contact 40 includes a first contacting portion 46, which includes part of an outer face of the first extending portion 45*a* in the front-rear direction. The contact 40 includes a second contacting portion 47, which includes part of an inner face of the second extending portion 45*c* in the front-rear direction.

As illustrated in FIGS. 5 and 6, the contact 40 is attached to the contact attachment groove 24 of the insulator 20. For example, the first engaging portion 42 of the contact 40 engages the first engaging portion 24*a* of the contact attachment groove 24. At this time, the supported section 45 of the contact 40 is supported by the longitudinal wall 21*b*, serving as a side wall. The first extending portion 45*a* of the supported section 45 is disposed in the first groove portion 24*b* of the contact attachment groove 24. The turned portion 45*b* of the supported section 45 is disposed in the turned portion 24*c* of the contact attachment groove 24. The second extending portion 45*c* of the supported section 45 is disposed in the second groove portion 24*d* of the contact attachment groove 24. The second engaging portion 45*d* of the supported section 45 engages the second engaging portion 24*e* of the contact attachment groove 24.

Once the contact 40 is attached to the contact attachment groove 24, the first contacting portion 46 of the contact 40 is exposed in the first groove portion 24*b* of the contact attachment groove 24 on the outer side in the front-rear direction. The second contacting portion 47 of the contact 40 is exposed in the second groove portion 24*d* of the contact attachment groove 24 on the inner side in the front-rear direction and faces the mating depression 23. The bent portion 43 of the contact 40 is located in the first engaging portion 24*a* of the contact attachment groove 24 and is located at the lower end of the first groove portion 24*b*.

The first engaging portion 42 of the contact 40 is located between the mounting portion 41 and the bent portion 43, and engages the insulator 20. The bent portion 43 of the contact 40 is located between the mounting portion 41 and the first contacting portion 46. The bent portion 43 is located between the mounting portion 41 and the supported section 45. At this time, the recess 25 of the insulator 20 is formed in the insulator 20 and extends from an end of the bent portion 43 adjacent to the first contacting portion 46 toward the mounting portion 41. In the front-rear direction, the recess 25 faces the first engaging portion 42 of the contact 40 in engagement with the first engaging portion 24*a* and the bent portion 43 located at the lower end of the first groove portion 24*b*. The recess 25 has a slightly larger dimension in the left-right direction than that of the bent portion 43 of the contact 40. The recess 25 is formed in the insulator 20 such that the recess 25 continuously extends from a position corresponding to the end of the bent portion 43 adjacent to the first contacting portion 46 in the up-down direction beyond a position corresponding to the first engaging portion 42 in the up-down direction to the bottom surface of the insulator 20. The recess 25 defines a space between the insulator 20 and the first engaging portion 42 and the bent portion 43 of the contact 40.

As illustrated in FIG. 7, the fitting 30 is attached to the insulator 20. For example, the engaging portions 31 of the fitting 30 engage the fitting attachment groove 26 of the insulator 20. The fitting 30, which is press-fitted in the fitting attachment groove 26 of the insulator 20, is disposed at each of the opposite ends of the insulator 20 in the left-right direction.

As illustrated in FIG. 8, the narrowed portion 44 of the contact 40 defines a space between the contact 40 and the insulator 20 in the left-right direction. As described above, the recess 25 of the insulator 20 defines a space between the contact 40 and the insulator 20 in the front-rear direction. As described above, the narrowed portion 44 of the contact 40 is not in contact with the insulator 20 in the front-rear and left-right directions.

The connector 10 with the above-described structure is mounted on a circuit formation surface formed on a mounting surface of the circuit board CB1. More specifically, the mounting portions 32 of the fittings 30 are placed on a soldering paste applied to a pattern on the circuit board CB1. The mounting portions 41 of the contacts 40 are placed on the soldering paste applied to the pattern on the circuit board CB1. The mounting portions 32 and the mounting portions 41 are soldered to the pattern by heating and melting the soldering paste in, for example, a reflow furnace. Thus, the mounting of the connector 10 on the circuit board CB1 is completed. For example, an electronic component different from the connector 10, for example, a central processing unit (CPU), a controller, or a memory, is mounted on the circuit formation surface of the circuit board CB1.

Figure 9:
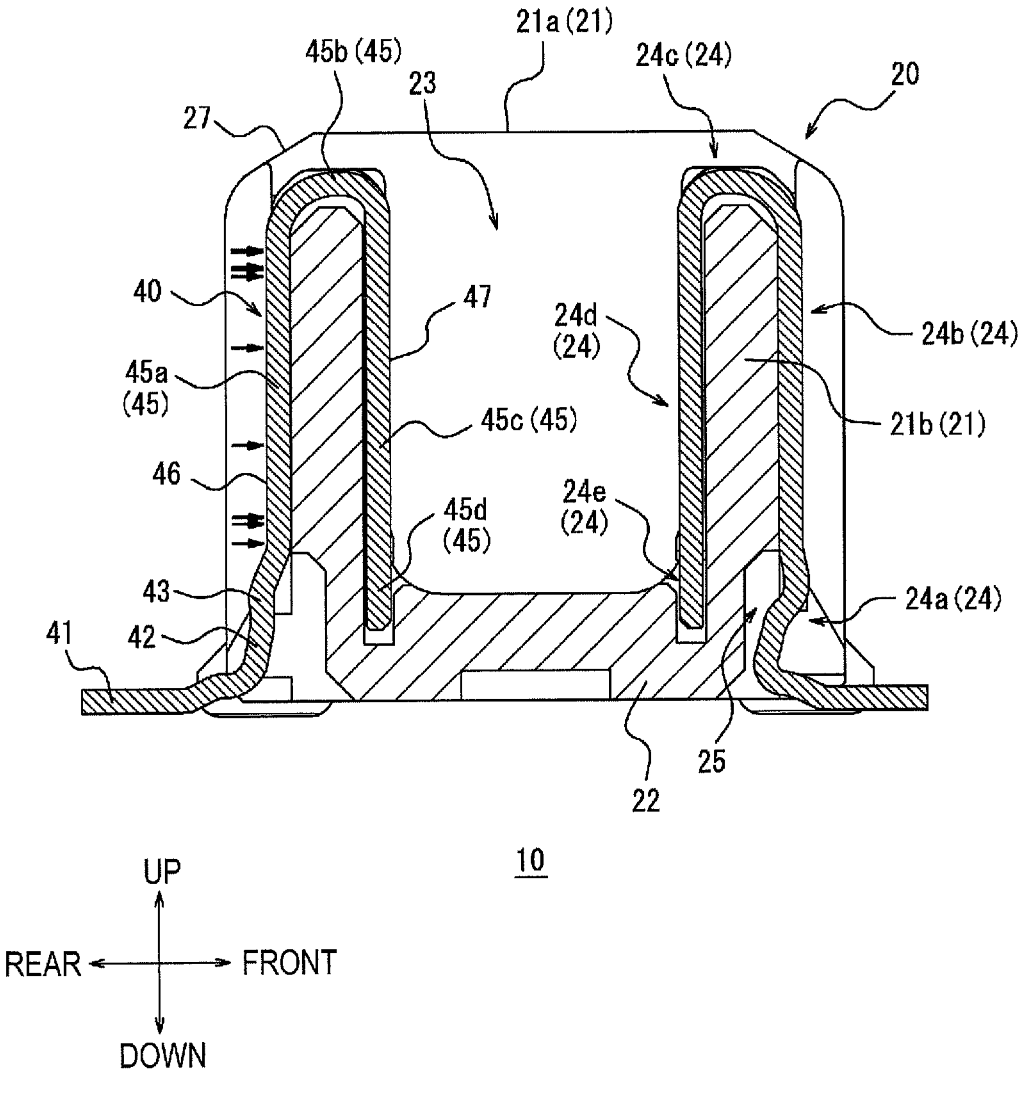
FIG. 9 is a cross-sectional view equivalent to FIG. 5.

FIG. 9 is a cross-sectional view equivalent to FIG. 5. With reference to FIG. 9, the functions of the components of the connector 10 during resilient deformation of each contact 40 at the bent portion 43 in response to stress applied to the contact 40 will now be mainly described.

As described above, the mounting portions 32 of the fittings 30 and the mounting portions 41 of the contacts 40 are soldered to the circuit board CB1, thus fixing the insulator 20 to the circuit board CB1. When an external force is applied to the connector 10 in such a state, the fittings 30 and the contacts 40 are slightly resiliently deformed, thus slightly changing the position of the insulator 20 relative to the circuit board CB1.

For example, it is assumed that an external force directed in, for example, a rear-to-front direction, is applied to the connector 10 and the contacts 40, as illustrated in FIG. 9. At this time, each contact 40 experiences stress, so that the contact 40 is resiliently deformed at the bent portion 43. For example, a portion of the contact 40 that is located between the supported section 45 and the mounting portion 41 is resiliently deformed.

For example, for the contact 40 attached to a rear portion of the insulator 20 in FIG. 9, the bent portion 43 is resiliently deformed such that a smoothly bent or raised mound-like shape in cross-section changes to a shape bent linearly in the front-rear direction. For example, in a down-to-up direction, the bent portion 43 extends straight upward and is then inclined obliquely upward in the rear-to-front direction. The position of the first engaging portion 42, which is located below the bent portion 43, relative to the insulator 20 in the front-rear direction is shifted rearward as compared with the position thereof in a state where the contact 40 is not resiliently deformed. In the contact 40 attached to the rear portion of the insulator 20, the portion between the supported section 45 and the mounting portion 41 is resiliently deformed such that the whole of the portion therebetween is inclined obliquely upward in the rear-to-front direction.

For example, for the contact 40 attached to a front portion of the insulator 20 in FIG. 9, the bent portion 43 is resiliently deformed such that the smoothly bent or raised mound-like shape in cross-section changes to a shape bent inward in the recess 25 of the insulator 20. For example, in the up-to-down direction, the bent portion 43 is slightly inclined outward in the front-rear direction and is then greatly bent inward in the recess 25 of the insulator 20. The position of the first engaging portion 42, which is located below the bent portion 43, relative to the insulator 20 in the front-rear direction is shifted rearward as compared with the position thereof in the state where the contact 40 is not resiliently deformed. In the contact 40 attached to the front portion of the insulator 20, the portion between the supported section 45 and the mounting portion 41 is resiliently deformed while being greatly bent such that most of the portion therebetween is located inside the recess 25.

As described above, the space defined by the recess 25 is located between the insulator 20 and a portion of the contact 40 that is to be resiliently deformed at the bent portion 43. The space defined by the recess 25 can partly receive the portion between the supported section 45 and the mounting portion 41 of the contact 40 when the contact 40 is resiliently deformed at the bent portion 43 in response to stress applied to the contact 40. As described above, the space is provided between the bent portion 43 and the insulator 20 so that the bent portion 43 can be resiliently deformed. The space is provided between the resilient portion of the contact 40 and the insulator 20 in the direction perpendicular to the mating direction in which the connector 10 and the connection object 50 are mated with each other. For example, the space is provided between the bent portion 43 and the insulator 20 in the thickness direction of the contact 40.

The structure of the connection object 50 will now be described with reference mainly to FIGS. 10 and 11.

FIG. 10 is a downward perspective view of the connection object 50 to be connected to the connector 10 of FIG. 3. FIG. 11 is a downward exploded perspective view of the connection object 50 of FIG. 10.

As illustrated in FIG. 11, the connection object 50 includes, as large components, the insulator 60, the fittings 70, and the contacts 80. The connection object 50 is assembled by press-fitting the fittings 70 and the contacts 80 from below into the insulator 60.

The insulator 60 is a rectangular prism-shaped member made of an insulating heat-resistant synthetic resin material formed by injection molding. The insulator 60 includes a mating depression 61, which is recessed from an upper surface of the insulator 60 and extends straight in the left-right direction. The insulator 60 includes a mating protrusion 62, which protrudes from a central part of the mating depression 61 and extends straight in the left-right direction. The mating protrusion 62 is surrounded by an outer peripheral wall of the insulator 60 in the front-rear and left-right directions.

The insulator 60 includes guides 63, which are located at inner upper edges of opposite ends of the mating depression 61 in the left-right direction. Each of the guides 63 is a sloped face of the upper edge of the mating depression 61 that slopes downward and obliquely inward. The insulator 60 includes fitting attachment grooves 64, which are located at opposite ends of the insulator 60 in the left-right direction and are recessed or extend upward from a bottom surface of the insulator 60.

The insulator 60 includes multiple contact attachment grooves 65. The contact attachment grooves 65 are recessed in a front part of the bottom of the insulator 60, a front inner face of the mating depression 61, and a front side face of the mating protrusion 62. The contact attachment grooves 65 are recessed in a rear part of the bottom of the insulator 60, a rear inner face of the mating depression 61, and a rear side face of the mating protrusion 62. The multiple contact attachment grooves 65 are spaced apart from each other at predetermined intervals in the left-right direction.

Each fitting 70 is formed by shaping a sheet of any metallic material into a form illustrated in FIG. 11 with a progressive die (stamping). The fitting 70 is U-shaped when viewed from above. The fitting 70 includes mounting portions 71, which are located at a lower end of the fitting 70 and extend outward in the front-rear direction to define an L-shape. The fitting 70 includes an engaging portion 72, which continuously extends from the mounting portions 71 and is U-shaped when viewed from above.

Each contact 80 is formed by shaping a sheet of, for example, a copper alloy containing, for example, phosphor bronze, beryllium copper, or titanium copper, and having spring resiliency or a Corson alloy into a form illustrated in FIG. 11 with a progressive die (stamping). The contact 80 is formed only by stamping, for example. The contact 80 is flat or uniform in thickness in the left-right direction. The method of forming the contact 80 is not limited to this example. For example, the method may include, after stamping, bending a workpiece in the thickness direction. The contact 80 is plated with nickel, serving as an undercoat layer, and is further plated with, for example, gold or tin, serving as a surface layer.

The multiple contacts 80 are arrayed in the left-right direction. Each of the contacts 80 includes a mounting portion 81, which extends outward in the front-rear direction. The contact 80 includes an engaging portion 82, which extends straight upward from the mounting portion 81. The contact 80 includes a resilient contacting portion 83, which extends from a junction of the mounting portion 81 and the engaging portion 82 inwardly in the front-rear direction. The resilient contacting portion 83 is U-shaped as viewed in the left-right direction. The resilient contacting portion 83 is bifurcated. The resilient contacting portion 83 includes a first resilient contacting part 83*a*, which is located adjacent to the engaging portion 82 in the front-rear direction. The resilient contacting portion 83 includes a second resilient contacting part 83*b*, which is located remoter from the engaging portion 82 than the first resilient contacting part 83*a* in the front-rear direction and is opposite the first resilient contacting part 83*a* in the front-rear direction.

As illustrated in FIG. 10, the fittings 70 are attached to the fitting attachment grooves 64 of the insulator 60. For example, the engaging portions 72 of the fittings 70 engage the fitting attachment grooves 64 of the insulator 60. The fittings 70 are arranged at the opposite ends of the insulator 60 in the left-right direction.

Figure 12:
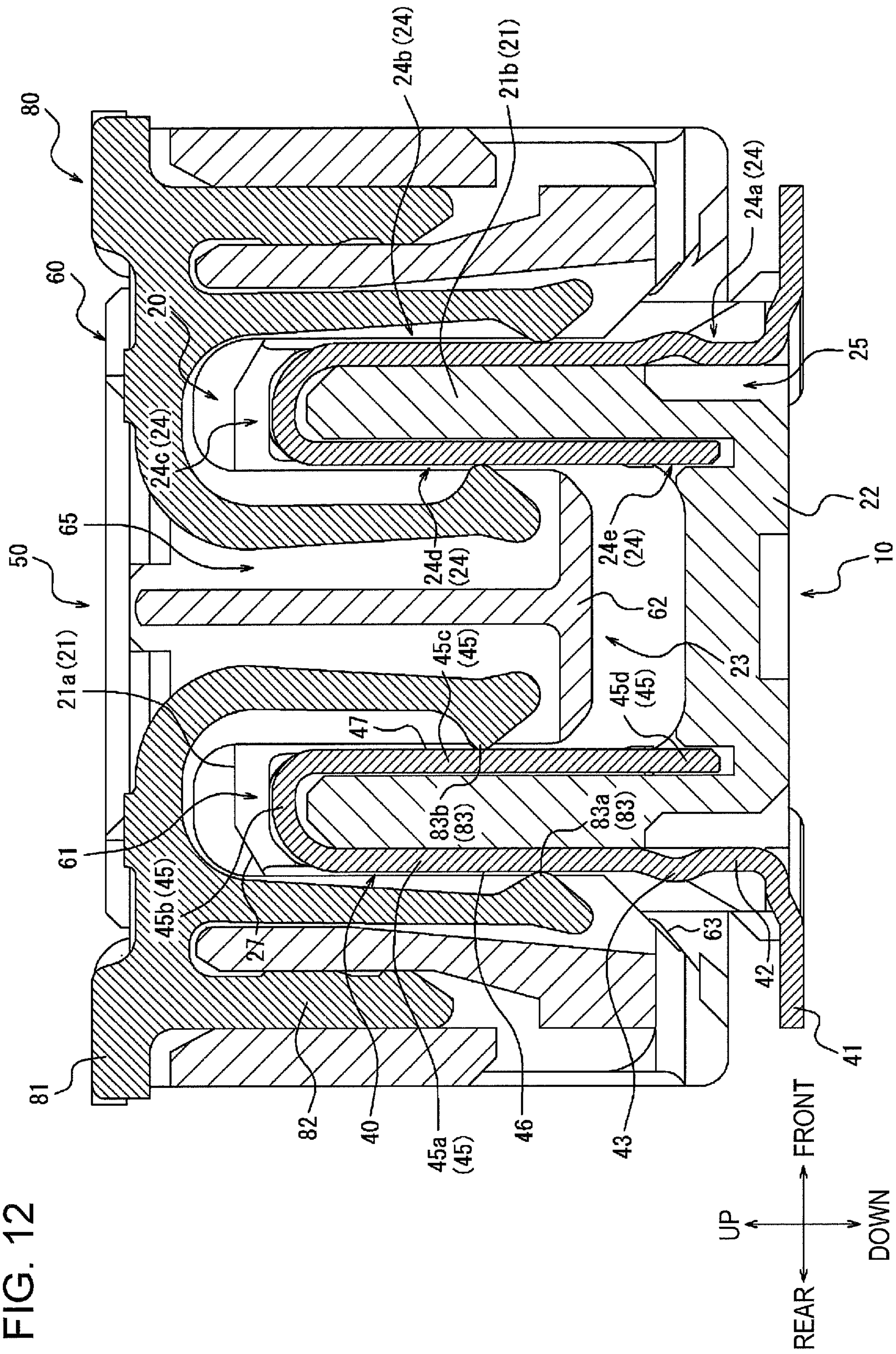
FIG. 12 is a cross-sectional view taken along arrow line XII-XII in FIG. 1.

Each of the multiple contacts 80 is attached to a respective one of the multiple contact attachment grooves 65 of the insulator 60. For example, as illustrated in FIG. 12, which will be described later, the engaging portion 82 of the contact 80 engages a portion of the contact attachment groove 65 of the insulator 60 that is recessed in a side wall of the insulator 60. At this time, an end of the first resilient contacting part 83*a* of the contact 80 is positioned in a portion of the contact attachment groove 65 of the insulator 60 that is located in the inner face of the mating depression 61 in the front-rear direction, and is exposed to the inside of the mating depression 61. Similarly, an end of the second resilient contacting part 83*b* of the contact 80 is positioned in a portion of the contact attachment groove 65 of the insulator 60 that is located in the side face of the mating protrusion 62 in the front-rear direction, and is exposed to the inside of the mating depression 61. The first resilient contacting part 83*a* and the second resilient contacting part 83*b* are resiliently deformable in the front-rear direction in the contact attachment groove 65.

The connection object 50 with the above-described structure is mounted on, for example, a circuit formation surface formed on a mounting surface of the circuit board CB2. More specifically, the mounting portions 71 of the fittings 70 are placed on a soldering paste applied to a pattern on the circuit board CB2. The mounting portions 81 of the contacts 80 are placed on the soldering paste applied to the pattern on the circuit board CB2. The mounting portions 71 and the mounting portions 81 are soldered to the pattern by heating and melting the soldering paste in, for example, a reflow furnace. Thus, the mounting of the connection object 50 on the circuit board CB2 is completed. For example, electronic components different from the connection object 50 and including a camera module and a sensor are mounted on the circuit formation surface of the circuit board CB2.

FIG. 12 is a cross-sectional view taken along arrow line XII-XII in FIG. 1. Operation of the connector 10 when the connector 10 is connected to the connection object 50 will now be mainly described with reference mainly to FIG. 12.

The connection object 50 being upside down relative to the connector 10 is positioned opposite the connector 10 in the up-down direction such that the position of the connection object 50 in the front-rear and left-right directions substantially coincides with that of the connector 10. Then, the connection object 50 is moved downward. If the connector 10 and the connection object 50 are slightly misaligned with each other in, for example, the front-rear direction or the left-right direction, the guides 27 of the connector 10 and the guides 63 of the connection object 50 can contact each other.

Thus, the outer peripheral wall 21 of the insulator 20 of the connector 10 is guided into the mating depression 61 of the insulator 60 of the connection object 50. As the connection object 50 is further moved downward, the outer peripheral wall 21 of the insulator 20 is mated with the mating depression 61 of the insulator 60. The mating depression 23 of the insulator 20 is mated with the mating protrusion 62 of the insulator 60.

As illustrated in FIG. 12, in the mated state in which the insulator 20 of the connector 10 is mated with the insulator 60 of the connection object 50, each contact 40 of the connector 10 contacts the corresponding contact 80 of the connection object 50. More specifically, the first contacting portion 46 of the contact 40 contacts the first resilient contacting part 83*a* of the contact 80. The second contacting portion 47 of the contact 40 contacts the second resilient contacting part 83*b* of the contact 80. The contact 40 and the contact 80 are in contact with each other at two points. At this time, the end of the first resilient contacting part 83*a* of the contact 80 is slightly resiliently deformed outward in the front-rear direction, and is resiliently displaced into the contact attachment groove 65. Similarly, the end of the second resilient contacting part 83*b* of the contact 80 is slightly resiliently deformed inward in the front-rear direction, and is resiliently displaced into the contact attachment groove 65.

The connector 10 and the connection object 50 are completely connected in the above-described manner. At this time, the circuit board CB1 and the circuit board CB2 are electrically connected by the contacts 40 and the contacts 80.

In such a state, the first resilient contacting part 83*a* and the second resilient contacting part 83*b* of each contact 80 pinch the supported section 45 of the corresponding contact 40 of the connector 10 on the opposite sides in the front-rear direction with resiliency in the front-rear direction. This increases the strength of connection of the connection object 50 to the connector 10.

In the above-described embodiment, the connector 10 uses resilient deformation of the contact 40 to allow the connector 10 to be movable relative to the circuit board CB1. Furthermore, the resilient deformation reduces a load, such as stress applied to the mounting portion 41 of the contact 40. This allows the connector 10 to have improved reliability. For example, in the connector 10, each contact 40 includes the bent portion 43. When stress is applied to the contact 40, the contact 40 is resiliently deformed at the bent portion 43, thus dispersing the stress. The bent portion 43 included in the contact 40 increases the length of a resiliently deformable portion of the contact 40. This allows the contact 40 to be more flexible about the bent portion 43. In addition to the above-described effect of stress dispersion in the connector 10, a point at which the contact 40 is resiliently deformable can be clearly defined at the bent portion 43. Thus, the connector 10 can reduce concentration of stress on the mounting portion 41 of the contact 40, thus reducing a load on the mounting portion 41.

When the connector 10 experiences forces including a force in a direction parallel to the circuit board CB1 and a rotational force in a plane parallel to the circuit board CB1, the concentration of stress on the mounting portion 41 of the contact 40 can be reduced. This can reduce separation, breakage, and the like of the mounting portion 41 caused by a solder crack, for example.

A space is left between the insulator 20 and a portion of the contact 40 that is resiliently deformable at the bent portion 43. Therefore, the space can receive the portion resiliently deformable at the bent portion 43. Thus, the connector 10 allows the contact 40 to be resiliently deformed in response to stress applied to the contact 40.

The whole of the connector 10 is movable because the insulator 20, serving as a single component, is movable due to resilient deformation of the contacts 40. For example, the number of components for achieving the movability of the connector 10 can be reduced as compared with, for example, a connector with a floating structure including a fixed insulator and a movable insulator that is surrounded by the fixed insulator and that is movable relative to the fixed insulator. The connector 10 can be achieved with a smaller number of components and a smaller size than those of a connector with a floating structure.

The insulator 20 includes the recesses 25 each defining a space between the insulator 20 and a portion of the contact 40 that is resiliently deformable at the bent portion 43. Thus, the connector 10 allows the contact 40 to be resiliently deformed in response to stress applied to the contact 40. Each recess 25 formed in the insulator 20 extends from the end of the bent portion 43 adjacent to the first contacting portion 46 toward the mounting portion 41 and extends to the bottom surface of the insulator 20. This increases the above-described space. Therefore, the connector 10 reliably allows the contact 40 to be resiliently deformed in response to stress applied to the contact 40.

The contact 40 includes the narrowed portion 44, which reduces the dimension of the bent portion 43 in the longitudinal direction of the connector 10. This provides a space between the contact 40 and the insulator 20 at the narrowed portion 44 in the longitudinal direction of the connector 10. Thus, the connector 10 can reduce solder rising and flux rising from the mounting portion 41 caused by capillarity. This reduces the likelihood that solder rising and flux rising from the mounting portion 41 may reduce the resiliency of the bent portion 43 and fix the bent portion 43. This reduces degradation of the properties of resilient deformation of the contact 40 at the bent portion 43.

The narrowed portion 44 is located at the end of the bent portion 43 adjacent to the mounting portion 41. This allows the above-described effect of reducing the degradation of the properties of resilient deformation to become pronounced. In addition, the recess 25 of the insulator 20 provides a space between the contact 40 and the insulator 20 in the front-rear direction at the narrowed portion 44. This allows the above-described effect of reducing the degradation of the properties of resilient deformation to become more pronounced.

Additionally, the narrowed portion 44 of the contact 40 allows the first engaging portion 42 next to the narrowed portion 44 to have a clear shape. For example, for a stamping operation in forming the contact 40, the shape of the first engaging portion 42 is clear upon stamping a workpiece from a sheet with a die. This improves the workability of attachment of the contact 40 to the insulator 20.

The bent portion 43 is bent to have a mound-like shape in cross-section and protrudes in the direction away from the insulator 20. Such a configuration of the connector 10 allows the above-described space capable of receiving the portion resiliently deformable at the bent portion 43 to be maintained as a large space. Thus, the connector 10 more reliably allows the contact 40 to be resiliently deformed in response to stress applied to the contact 40.

The contact 40 includes the first engaging portion 42, which is located between the mounting portion 41 and the bent portion 43 and engages the insulator 20. Such a configuration of the contact 40 reduces the likelihood that resilient deformation of the contact 40 at the bent portion 43 may affect the mounting portion 41. This further reduces a load on the mounting portion 41. The contact 40 engages the insulator 20 at two portions, or the first engaging portion 42 and the second engaging portion 45*d*. This allows the insulator 20 to more firmly retain the contact 40. Thus, resilient deformation of the contact 40 at the bent portion 43 is less likely to affect the mounting portion 41. This results in a further reduction in load on the mounting portion 41.

The connector 10 includes the fittings 30, each of which is attached to the insulator 20 and is flat or uniform in thickness in the longitudinal direction of the connector 10. Such a configuration of the connector 10 can increase the strength of mounting of the insulator 20 on the circuit board CB1. For example, each fitting 30 is press-fitted into the insulator 20, and the mounting portions 32 are soldered to the circuit board CB1. Thus, the fitting 30 enables the insulator 20 to be stably fixed to the circuit board CB1.

The fitting 30 includes the notches 33, which are formed by cutting away parts of the engaging portions 31 that are located next to the mounting portions 32 extending from the engaging portions 31 and that extend in the mating direction. Thus, the fitting 30 is resiliently deformable in response to resilient deformation of the contact 40 at the bent portion 43. Thus, the connector 10 allows the fitting 30 and the contact 40 to be resiliently deformed when the connector 10 experiences forces including a force in a direction parallel to the circuit board CB1 and a rotational force in a plane parallel to the circuit board CB1.

The insulator 20 includes the guides 27. This allows the mating depression 61 of the connection object 50 to be readily guided to the outer peripheral wall 21 of the insulator 20. This facilitates insertion of the connection object 50 into the connector 10.

The contact 40 is made of a metallic material having a low modulus of elasticity. This ensures that the contact 40 can be resiliently deformed by a necessary amount even when a small external force is applied to the connector 10. The connector 10 can sufficiently disperse stress with resilient deformation of the contact 40 at the bent portion 43. Thus, the connector 10 can sufficiently reduce a load on the mounting portion 41 of the contact 40.

The connector 10 can absorb vibration caused by any external factor with resilient deformation of the contact 40 at the bent portion 43. Thus, the connector 10 can reduce a load on the mounting portion 41 of the contact 40. This reduces breakage of a connection between the mounting portion 41 and the circuit board CB1. This can keep solder at the connection between the mounting portion 41 and the circuit board CB1 from cracking. This improves connection reliability even while the connector 10 is connected to the connection object 50.

It will be apparent to those skilled in the art that the present disclosure can be implemented in other specific forms in addition to the above-described embodiment without departing from the spirit or essential characteristics of the present disclosure. Therefore, the above description is illustrative and is not restrictive. The scope of the present disclosure is defined by the appended claims, rather than the foregoing description. Some variations that are within the range of equivalents of all variations are intended to be encompassed within the scope of the present disclosure.

For example, the shape, placement, and orientation of each component described above and the number of components are not limited to those illustrated in the above description and the figures. Any number of components having any shape, placement, and orientation may be used as long as the function of the component can be achieved.

The above-described methods of assembling the connector 10 and the connection object 50 are not limited to details in the above description. Each of the connector 10 and the connection object 50 may be assembled in any manner that allows the functions to be achieved. For example, at least one of the fitting 30 or the contact 40 may be formed integrally with the insulator 20 by insert molding, rather than press fitting. For example, at least one of the fitting 70 or the contact 80 may be formed integrally with the insulator 60 by insert molding, rather than press fitting.

In the above-described embodiment, the resilient portion includes the bent portion 43, which is bent in a direction perpendicular to the mating direction in which the connector 10 and the connection object 50 are mated with each other. The configuration is not limited to this example. For example, the resilient portion does not necessarily need to be bent. The resilient portion may have a small dimension or thickness in the front-rear direction so that this portion is resiliently deformable.

In the above-described embodiment, the recess 25 formed in the insulator 20 extends from the end of the bent portion 43 adjacent to the first contacting portion 46 toward the mounting portion 41 and extends to the bottom surface of the insulator 20. The configuration is not limited to this example. The recess 25 may be formed in any region of the insulator 20 in the up-down direction as long as the recess 25 defines a space between the insulator 20 and a portion of the contact 40 that is deformable at the bent portion 43. For example, the recess 25 formed in the insulator 20 does not necessarily need to extend to the bottom surface of the insulator 20. The recess 25 formed in the insulator 20 may extend to any position above the bottom surface of the insulator 20.

In the above-described embodiment, the contact 40 includes the narrowed portion 44, which reduces the dimension of the bent portion 43 in the longitudinal direction of the connector 10. The configuration is not limited to this example. The contact 40 may include a narrowed portion that reduces the dimension of the bent portion 43 in the lateral direction of the connector 10. The contact 40 may include no component that reduces the dimension of the bent portion 43 like the narrowed portion 44.

In the above-described embodiment, the bent portion 43 is bent to have a mound-like shape in cross-section and protrudes in the direction away from the insulator 20. The configuration is not limited to this example. The bent portion 43 may be bent and protrude toward the insulator 20.

In the above-described embodiment, the contact 40 includes the first engaging portion 42 located between the mounting portion 41 and the bent portion 43 and engaging the insulator 20. The configuration is not limited to this example. The contact 40 may include the first engaging portion 42 at a position other than between the mounting portion 41 and the bent portion 43. In the above description, the contact 40 includes two engaging portions, or the first engaging portion 42 and the second engaging portion 45*d*. The configuration is not limited to this example. The contact 40 may include only one engaging portion or may include three or more engaging portions.

In the above-described embodiment, the connector 10 includes the fittings 30 attached to the insulator 20. The configuration is not limited to this example. The connector 10 may include no fitting 30.

In the above-described embodiment, the contact 40 is made of a metallic material having a low modulus of elasticity. The configuration is not limited to this example. The contact 40 may be made of a metallic material having any modulus of elasticity as long as the contact 40 can be certainly deformed resiliently by a necessary amount.

In the above-described embodiment, only the contact 40 of the connector 10 includes the bent portion 43, and the contact 40 is resiliently deformed at the bent portion 43 in response to stress applied to the contact 40. The configuration is not limited to this example. The contact 80 of the connection object 50 may include a component similar to the bent portion 43 of the contact 40.

In the above-described embodiment, the connection object 50 is a receptacle connector connected to the circuit board CB2. The connection object 50 is not limited to this example. The connection object 50 may be any object other than a connector. For example, the connection object 50 may be an FPC, a flexible flat cable, a rigid board, or an edge connector of any circuit board.

The above-described connector 10 is mounted on an electronic device. Examples of the electronic device include any on-vehicle equipment including a camera, a radar, a dashboard camera, and an engine control unit. Examples of the electronic device include any on-vehicle equipment used in on-vehicle systems, such as a car navigation system, an advanced driver assistance system, and a security system. Examples of the electronic device include any information equipment, such as a personal computer, a smartphone, a copier, a printer, a facsimile, and a multifunction machine. Examples of the electronic device further include any industrial equipment.

Such an electronic device can reduce a load, caused by stress, on the mounting portion 41 of the contact 40 of the connector 10. This can reduce separation, breakage, and the like of the mounting portion 41 caused by a solder crack, for example. This results in improved reliability of the electronic device, serving as a product, including the connector 10.

REFERENCE SIGNS

10 connector
20 insulator
21 outer peripheral wall
21*a* lateral wall
21*b* longitudinal wall (side wall)
22 bottom wall
23 mating depression
24 contact attachment groove
24*a* first engaging portion
24*b* first groove portion
24*c* turned portion
24*d* second groove portion
24*e* second engaging portion
25 recess
26 fitting attachment groove
27 guide
30 fitting
31 engaging portion
32 mounting portion
33 notch
40 contact
41 mounting portion
42 first engaging portion (engaging portion)
43 bent portion (resilient portion)
44 narrowed portion
45 supported section
45*a* first extending portion
45*b* turned portion
45*c* second extending portion
45*d* second engaging portion
46 first contacting portion (contacting portion)
47 second contacting portion
50 connection object
60 insulator
61 mating depression
62 mating protrusion
63 guide
64 fitting attachment groove
65 contact attachment groove
70 fitting
71 mounting portion
72 engaging portion
80 contact
81 mounting portion
82 engaging portion
83 resilient contacting portion
83*a* first resilient contacting part
83*b* second resilient contacting part
CB1, CB2 circuit board

The invention claimed is:

1. A connector that is mounted on a circuit board and is to be mated with a connection object, the connector comprising:

an insulator comprising a pair of side walls and having a rectangular shape; and multiple contacts attached to the pair of side walls, each of the multiple contacts comprising a mounting portion, a resilient portion, and a contacting portion, the mounting portion being mounted on the circuit board, the contacting portion being configured to contact a connection object while the connector and the connection object are mated with each other, the resilient portion being located between the mounting portion and the contacting portion and being resiliently deformable, wherein the resilient portion and the insulator define a space therebetween, wherein the resilient portion comprises a bent portion bent in a direction perpendicular to a mating direction in which the connector and the connection object are mated with each other, wherein the insulator comprises a recess formed in the insulator and extending toward the mounting portion, and the recess defines the space, wherein the recess formed in the insulator extends from an end of the resilient portion adjacent to the contacting portion toward the mounting portion, wherein the space is defined between the resilient portion and the insulator in a direction perpendicular to a mating direction in which the connector and the connection object are mated with each other, wherein each of the multiple contacts comprises a supported section supported by a respective one of the pair of side walls, and the resilient portion is located between the mounting portion and the supported section, wherein each of the multiple contacts comprises a narrowed portion reducing a dimension of the resilient portion in a longitudinal direction of the connector, wherein the narrowed portion is located at an end of the resilient portion adjacent to the mounting portion, and wherein the bent portion and the mounting portion are each bent away from the insulator.

2. The connector according to claim 1, wherein each of the multiple contacts comprises an engaging portion located between the mounting portion and the bent portion and engaging the insulator.

3. An electronic device comprising the connector according to claim 1.

4. The connector according to claim 1, wherein the mounting portion extends away from the contacting portion in a direction away from the insulator.

5. The connector according to claim 1, wherein the resilient portion connects the contact portion to the mounting portion.

* * * * *